(12) United States Patent
Chen

(10) Patent No.: US 7,136,987 B2
(45) Date of Patent: Nov. 14, 2006

(54) MEMORY CONFIGURATION APPARATUS, SYSTEMS, AND METHODS

(75) Inventor: Inching Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 282 days.

(21) Appl. No.: 10/815,173

(22) Filed: Mar. 30, 2004

(65) Prior Publication Data

US 2005/0223155 A1 Oct. 6, 2005

(51) Int. Cl.
*G06F 12/00* (2006.01)
*G06F 9/34* (2006.01)

(52) U.S. Cl. .................................. 711/211; 711/214
(58) Field of Classification Search .................. 711/1, 711/220, 211, 214; 712/20, 200, 229, 1; 710/100, 129, 305, 307, 316, 317; 345/568
See application file for complete search history.

(56) References Cited

U.S. PATENT DOCUMENTS

| | | | | |
|---|---|---|---|---|
| 4,663,729 A | * | 5/1987 | Matick et al. ............. 345/568 |
| 4,667,305 A | * | 5/1987 | Dill et al. ................. 710/307 |
| 5,197,140 A | * | 3/1993 | Balmer ..................... 711/220 |
| 5,212,777 A | * | 5/1993 | Gove et al. ............... 712/229 |
| 5,226,125 A | * | 7/1993 | Balmer et al. ............ 710/317 |
| 5,239,654 A | * | 8/1993 | Ing-Simmons et al. ..... 712/20 |
| 5,361,373 A | * | 11/1994 | Gilson ........................ 712/1 |
| 5,493,656 A | * | 2/1996 | Tsukamoto ............... 710/100 |
| 5,535,410 A | * | 7/1996 | Watanabe et al. .......... 712/20 |
| 5,553,252 A | * | 9/1996 | Takayanagi et al. ...... 710/316 |
| 5,625,836 A | * | 4/1997 | Barker et al. ............. 709/214 |
| 5,717,994 A | * | 2/1998 | Goldsmith .................. 2/19 |
| 5,956,741 A | * | 9/1999 | Jones ........................ 711/1 |
| 6,094,715 A | * | 7/2000 | Wilkinson et al. .......... 712/20 |
| 6,112,017 A | * | 8/2000 | Wise ........................ 712/200 |
| 6,182,183 B1 | * | 1/2001 | Wingard et al. .......... 710/305 |
| 2001/0034805 A1 | * | 10/2001 | Usui et al. ................ 710/129 |

* cited by examiner

*Primary Examiner*—Pierre Bataille
*Assistant Examiner*—Paul Schlie
(74) *Attorney, Agent, or Firm*—Schwegman, Lundberg, Woessner & Kluth, P.A.

(57) ABSTRACT

An apparatus and a system, as well as a method and article, may operate to control a bandwidth of a memory coupled to a plurality of data processing units responsive to protocol indications, such as a number of data processing units in use. In some embodiments, apparatus and systems, as well as methods and articles, may operate to select a memory access group size of about $2^N$ memory banks responsive to receiving an indication of a change in a protocol type, wherein the group is selected from a number B of banks, and N is associated with the protocol type.

23 Claims, 3 Drawing Sheets

| MODE OF ACCESSES | BANK 0 | BANK 1 | BANK 2 | BANK 3 |
|---|---|---|---|---|
| 32-BIT ACCESS: | 0 → 0 | 0 → 1 | 0 → 2 | 0 → 3 |
|  | 1 → 4 | 1 → 5 | 1 → 6 | 1 → 7 |
|  | 2 → 8 | 2 → 9 | 2 → 10 | 2 → 11 |
|  | 3 → 12 | 3 → 13 | 3 → 14 | 3 → 15 |
| 64-BIT ACCESS: | 0 → 0 | 1 → 1 | 0 → 2 | 1 → 3 |
|  | 2 → 4 | 3 → 5 | 2 → 6 | 3 → 7 |
|  | 4 → 8 | 5 → 9 | 4 → 10 | 5 → 11 |
|  | 6 → 12 | 7 → 13 | 6 → 14 | 7 → 15 |
| 128-BIT ACCESS: | 0 → 0 | 1 → 1 | 2 → 2 | 3 → 3 |
|  | 4 → 4 | 5 → 5 | 6 → 6 | 7 → 7 |
|  | 8 → 8 | 9 → 9 | 10 → 10 | 11 → 11 |
|  | 12 → 12 | 13 → 13 | 14 → 14 | 15 → 15 |

*FIG. 1*

MEMORY CONFIGURATION APPARATUS, SYSTEMS, AND METHODS

TECHNICAL FIELD

Various embodiments described herein relate to information processing generally, such as apparatus, systems, and methods used to store and retrieve data.

BACKGROUND INFORMATION

Computer system performance may be highly dependent on associated memory system operational efficiency. For example, processing that stalls when data is unavailable can render results at an unacceptably slow rate.

Many memory systems have been designed to support a fixed data bus width, with an implicit fixed data processing bandwidth. However, different applications may be able to use a variety of memory access data widths, such as 32 bits, 64 bits, and 128 bits, among others. As a result, there may be a disparity between the number of data bits available from memory and the number of data bits sought by the processor when executing a particular application. If the available bandwidth is too small, extra memory cycles may be required to process a given amount of data. If the available bandwidth is too large, the existing memory capacity may not be used efficiently.

BRIEF DESCRIPTION OF THE DRAWINGS

FIG. 1 is a memory address-mapping table according to various embodiments;

DETAILED DESCRIPTION

Figure 2:
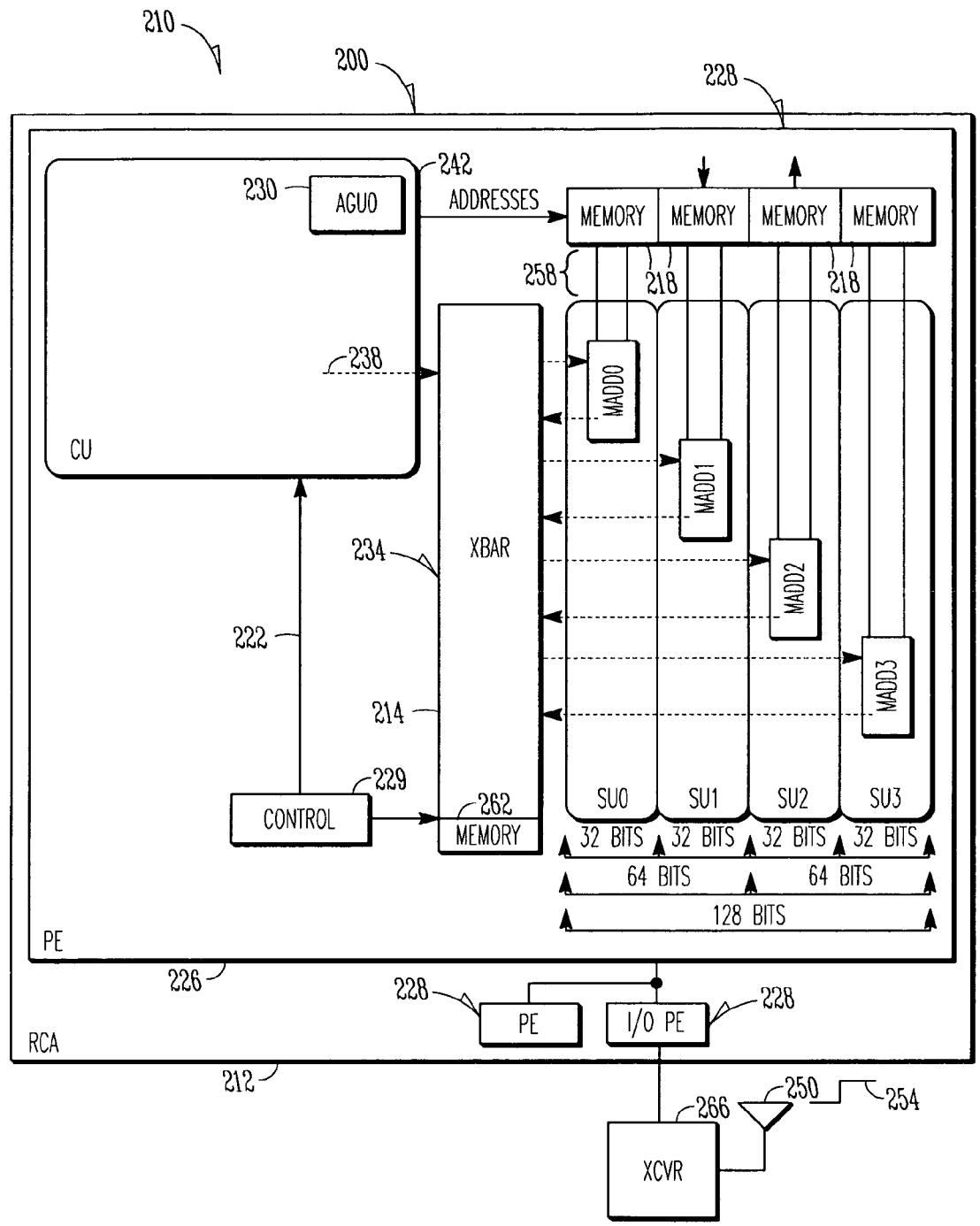
FIG. 2 is a block diagram of an apparatus and a system according to various embodiments.

In some embodiments, a memory subsystem may have a bandwidth scalable according to various received indications, such as a particular hardware or software operating configuration, or the number of processors to be used in carrying out certain kinds of operations. For example, in a reconfigurable communications architecture (RCA), the number of data processing units (DPUs) used in a processing element (PE) may change according to the processing requirements of a particular function (e.g., single-instruction, multiple-data (SIMD) and multiple-instruction, multiple-data (MIMD) operations) and/or application.

In some embodiments, memory address access mapping may operate to support both MIMD and SIMD types of operation. For example, assuming that a memory subsystem includes four banks of interleaved memory, and depending on the number of DPUs used, one, two, or four banks of memory may be substantially simultaneously deployed for data storage and retrieval. Thus, in some embodiments, the memory subsystem associated with an RCA may operate to change bandwidth (e.g., the number of bits accessed in a memory read and/or write operation) based on the number of processors in use.

For the purposes of this document, the term "energy conduit" includes any type of device or apparatus that has the capability to transmit and/or receive energy to and/or from space. Examples of such energy conduits include antennas, infra-red transmitters, infra-red receivers, photo-emitters (e.g., light emitting diodes), photo-receptors (e.g., a photocell), and charge-coupled devices, among others.

A "protocol type" includes any rule or guide for formatting data as it is communicated, with respect to time, space, frequency, and/or some other organizing function. Examples of such formatting mechanisms include communications standards (e.g., IEEE 802.11, Bluetooth), communications protocols (e.g., transmission control protocol/Internet protocol), spread-spectrum communications techniques, multiple carrier communications techniques (e.g., orthogonal frequency division multiplexing), a data format (e.g., time division, multiple access), and various data types (e.g., binary, alphanumeric, audio, video). Other protocol types may include an operation type, such as MIMD and SIMD operation types, and instruction types, such as various classes or groups of instructions types that may be executed by a microprocessor. For more information regarding some of the formatting mechanisms mentioned above, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and "Bluetooth System Specification, Bluetooth Special Interest Group, Ver. 1.1, March 2001", and related amendments.

The term "transceiver" (e.g., a device including a transmitter and a receiver) may be used in place of either "transmitter" or "receiver" throughout this document. Thus, anywhere the term transceiver is used, "transmitter" and/or "receiver" may be substituted.

FIG. 1 is a memory address-mapping table 100 according to various embodiments. In this figure, a specific implementation of some embodiments is shown for simplicity, and it should not be used to limit the embodiments disclosed. Thus, assuming that a memory subsystem includes four banks of interleaved memory, and, depending on the number of DPUs used, that one, two, or four banks of memory can be substantially simultaneously deployed for data storage and retrieval, as noted above, some possible examples of address mapping required for supporting MIMD and SIMD operations are given in the table 100.

In some embodiments, as an example of MIMD operations, all DPUs may read memory location 0, but the actual data can come from locations [0], [1], [2], or [3], respectively (e.g., in 32-bit mode). In an example of SIMD operations, reading memory location 0 can result in reading data from locations [0 & 1] or [2 & 3] (e.g., in 64-bit mode), or [0, 1, 2 & 3] (e.g., in 128-bit mode).

Calculation of the physical mapped addresses to each memory bank for various modes of memory access (e.g., 32-bit word access, 64-bit two-word access, or 128-bit four-word access) can thus be simplified. A generalized mapping formula can be given as:

$$ADDR = (M/ACC\_BANKS) * TOT\_BANKS + OFFSET$$

where ADDR is the physical address to be accessed, M is the logical memory address in 32-bit words, ACC_BANKS is the number of banks to be accessed at a time (e.g., a group size of one bank for 32-bit mode, two banks for 64-bit mode, etc.), TOT_BANKS is the total number of banks that can be accessed (e.g., four banks in the assumed example), and OFFSET is the bank to be accessed.

For example, assume the existence of 8,192 bytes of memory having logical memory addresses having 13 bits M.

Then the physical mapping address ADDR may be generated as a one or two-bit shift of M to the left (for 64 and 128-bit access, respectively), and an offset of 0, 1, 2, or 3 AND'ed with the shifted value of M. Thus, the hardware for an address generation unit in some embodiments may make use of a two-bit left/right shifter and/or an adder.

FIG. 2 is a block diagram of an apparatus 200 and a system 210 according to various embodiments, each of which may operate in the manner described above. For example, an apparatus 200 may comprise an RCA 212 including one or more selection modules 214 to select a memory access group size of about $2^N$ memory banks 218 (e.g., 1, 2, or 4 banks) for one or more DPUs SU0, SU1, SU2, and SU3. The memory banks 218 may be multi-port memory banks. Some of the ports may be accessed internally using the DPUs SU0, SU1, SU2, and SU3, and some of the ports may be accessed externally, using other processing devices. The selection module 214, which can include a crossbar, may respond to receiving an indication 222 of a change in a protocol type, such as receiving an indication 222 of a change in an operation type (e.g., a SIMD operation, a MIMD operation, and a combination of SIMD and MIMD operations), and/or an instruction type. For example, such indications 222 may be received in the form of configuration instructions, such as operation codes. The group of banks 218 may be selected from a number B of banks. N may be associated with the protocol type and selected so that the memory access group size 2N is less than or equal to B. For example, in some embodiments, the memory access group size $2^N$ may be selected from a group of numbers including two raised to a positive integer power, such as 2, 4, . . . , B.

One or more of the DPUs SU0, SU1, SU2, and SU3 may be capable of addressing the number B of banks, and some or all of the DPUs SU0, SU1, SU2, and SU3 may be included in a single processing element (PE) 226.

Any number of PEs 228, including input/output (I/O) PEs, may be included in an RCA 212. Each of the PEs 228 may include one or more system controllers 229. The apparatus 200 may include a hardware or software address generator 230 to generate a physical address located in the $2^N$ memory banks 218. Thus, in some embodiments, the apparatus 200 may include a hardware element 234 to store a plurality of output indications 238 based on a corresponding plurality of memory access group sizes, which may in turn be selected responsive to a corresponding plurality of protocol type indications 222.

Thus, in some embodiments, an apparatus 200 may include, in combination, a number B of memory banks addressable using a memory access group size of about $2^N$ memory banks 218 responsive to receiving an indication 222 of a change in a protocol type, including an operation type, as well as an instruction type in order to map a plurality of logical addresses associated with the $2^N$ memory banks 218 to a plurality of physical addresses associated with the number B of banks. The group of banks 218 may be selected from the number B of banks, wherein N may be associated with the protocol type, and wherein the memory access group size $2^N$ may be less than or equal to about B. The protocol type may include a SIMD operation type, a MIMD operation type, and a combination of the SIMD and MIMD operation types. In many embodiments, the memory access group size may be reprogrammable and selectable in software.

In some embodiments, the processing element 226 may comprise an RCA processing element having four DPUs SU0–SU3 for fixed-point arithmetic processing (e.g., 16-bit Multiply and Add), four banks of memory 218, and a control unit (CU) 242. The DPUs SU0–SU3 may operate independently (e.g., in carrying out a MIMD operation), and in tandem (e.g., in carrying out a SIMD operation). The CU 242 may operate to control memory bank 218 access and crossbar configuration, provide operation codes to one or more of the processors SU0–SU3, and load/store data for the processors SU0–SU3. In some embodiments, multiple CUs 242 may be included in a single PE 226, 228. In this case, each CU 242 may be associated with a memory access group size or a selected group of DPUs SU0–SU3 (e.g., 1, 2, or four DPUs SU0–SU3). Other embodiments may be realized.

For example, a system 210 may include an apparatus 200, as well as an energy conduit 250 to transmit data 254 processed by one or more of the DPUs SU0–SU3. In some embodiments, the energy conduit may be selected from one or more of an antenna, an infra-red transmitter, an infra-red receiver, a photo-emitter, a photo-receptor, and/or a charge-coupled device. In some embodiments, the system 210 may include a bus 258 to couple one of the DPUs SU0–SU3 to each other and/or to the banks 218, including one of the number B of banks in a selected group.

In some embodiments, the system 210 may include a memory 262 to store a plurality of memory access group sizes indexed to a corresponding plurality of protocol types, such as operation types, including instruction types. In some embodiments, the system 210 may include a transceiver 266 to couple one or more of PEs 228, including one or more DPUs SU0–SU3 to the energy conduit 250.

The apparatus 200, system 210, RCA 212, selection module 214, memory banks 218, indication 222, processing elements 226, 228, system controller 229, address generator 230, hardware element 234, output indication 238, CU 242, data 254, bus 258, transceiver 266, and DPUs SU0, SU1, SU2, and SU3 may all be characterized as "modules" herein. Such modules may include hardware circuitry, and/or one or more processors and/or memory circuits, software program modules, including objects and collections of objects, and/or firmware, and combinations thereof, as desired by the architect of the apparatus 200 and the system 210, and as appropriate for particular implementations of various embodiments.

It should also be understood that the apparatus and systems of various embodiments can be used in applications other than transmitters and receivers, and other than for wireless systems, and thus, various embodiments are not to be so limited. The illustrations of an apparatus 200 and system 210 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, cellular telephones, personal computers, personal digital assistants (PDAs), workstations, radios, video players, vehicles, and others.

Figure 3:
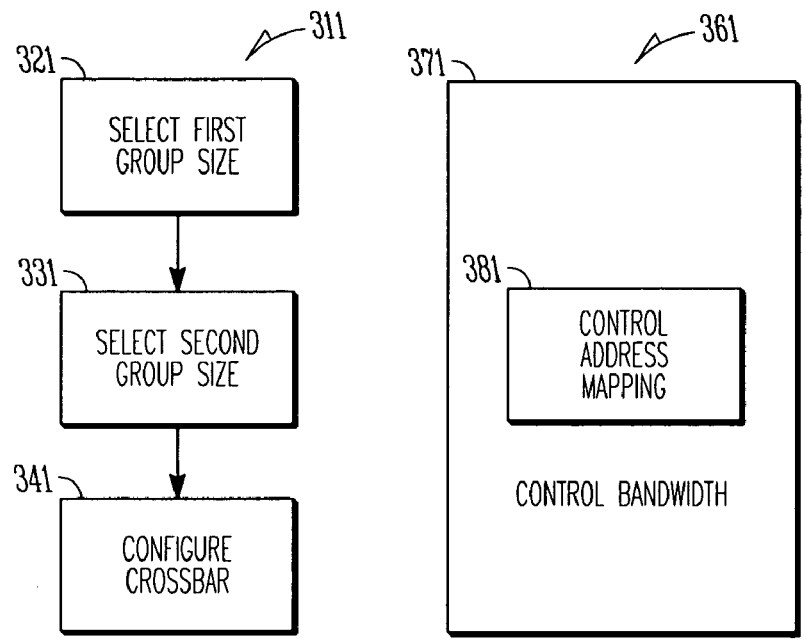
FIG. 3 is a flow chart illustrating several methods according to various embodiments.

FIG. 3 is a flow chart illustrating several methods according to various embodiments. In some embodiments of the invention, a method 311 may begin with selecting a memory access group size of about $2^N$ memory banks responsive to receiving an indication of a change in a protocol type, such as an operation type, including an instruction type at block 321. This activity may be accomplished in order to map a plurality of logical addresses associated with the $2^N$ memory banks to a plurality of physical addresses associated with the number B of banks.

As noted previously, the group of banks may be selected from a number B of banks. N may be associated with the protocol type, including an operation type, and may be selected so that $2^N$ is less than or equal to about B. Indications of a protocol type may be selected from hardware indications and software indications, among others. The protocol types may include one or more operation types, including SIMD and MIMD operation types. Other embodiments may be realized.

For example, in some embodiments, the method 311 may include selecting a first group size for a first DPU at block 321, which is different than a second group size selected for a second DPU at block 331. Each of the DPUs may be capable of addressing the number B of banks, and the sum total of memory banks accessed by all of the DPUs taken together may be limited to the number B of banks. In some embodiments, the memory access group size may be associated with a selected number of access bits (e.g., 32-bits, 64-bits, etc. as described previously).

In some embodiments, the method 311 may include configuring a crossbar at block 341 to operate using a memory access group size responsive to receiving an indication of a change in the protocol type, such as from one wireless protocol to another, or from one operation type (e.g., SIMD) to another (e.g., MIMD). Many other embodiments may be realized.

For example, a method 361 may include controlling a bandwidth of a memory coupled to a plurality of DPUs responsive to the number of DPUs in use at block 371 so that a plurality of logical addresses associated with the memory is mapped to a plurality of physical addresses associated with the memory. The number of DPUs in use may in turn be responsive to an indication provided by an application to be executed. And, as noted above, the bandwidth of the memory may be associated with a selected number of access bits provided by the plurality of data processing units. In some embodiments, controlling the bandwidth at block 371 may further include controlling an address-mapping function of the memory at block 381.

It should be noted that the methods described herein do not have to be executed in the order described, or in any particular order. Moreover, various activities described with respect to the methods identified herein can be executed in serial or parallel fashion. For the purposes of this document, the terms "information" and "data" may be used interchangeably. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java, Smalltalk, or C++. Alternatively, the programs can be structured in a procedure-orientated format using a procedural language, such as assembly or C. The software components may communicate using any of a number of mechanisms well-known to those skilled in the art, such as application program interfaces or inter-process communication techniques, including remote procedure calls. The teachings of various embodiments are not limited to any particular programming language or environment, including Hypertext Markup Language (HTML) and Extensible Markup Language (XML). Thus, other embodiments may be realized, as shown in FIG. 4.

Figure 4:
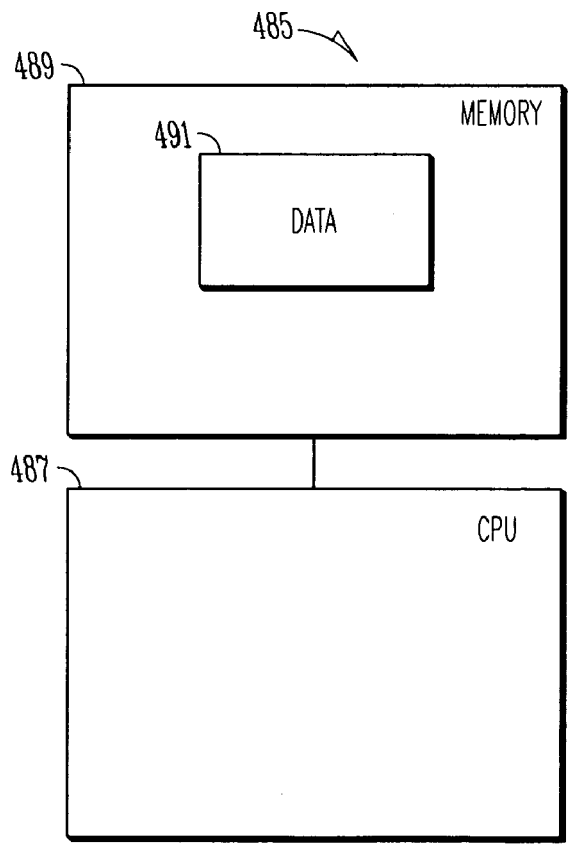
FIG. 4 is a block diagram of an article according to various embodiments.

FIG. 4 is a block diagram of an article 485 according to various embodiments, such as a computer, a memory system, a magnetic or optical disk, some other storage device, and/or any type of electronic device or system. The article 485 may comprise a processor 487 coupled to a machine-accessible medium such as a memory 489 (e.g., a memory including an electrical, optical, or electromagnetic conductor) having associated information 491 (e.g., computer program instructions, and/or other data), which when accessed, results in a machine (e.g., the processor 487) performing such actions as selecting a memory access group size of about $2^N$ memory banks responsive to receiving an indication of a change in a protocol type, wherein the group may be selected from a number B of banks, so that a plurality of logical addresses associated with the $2^N$ memory banks is mapped to a plurality of physical addresses associated with the number B of banks. N may be associated with the protocol type and selected so that $2^N$ is less than or equal to about B. The protocol type may be selected from at least one of a SIMD operation type, a MIMD operation type, and a combination of SIMD and MIMD operation types. Other activities may include selecting a first memory access group size for a first DPU different than a second memory access group size, and selecting the second memory access group size for a second DPU, wherein the first DPU and the second DPU are capable of addressing the number B of banks.

Implementing the apparatus, systems, and methods described herein may result in providing a reconfigurable memory in which the number of substantially simultaneously accessible data bits can vary according to an indication given by an application, among others. Scalable memory bandwidth may then be available as needed, and, in some embodiments, unnecessary processing elements and/or memory units may be disabled to save power.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, including:
   receiving an indication of a plurality of memory addresses, a protocol type, and an operation type;
   selecting a memory bank group consisting of one or more of a plurality of memory banks, wherein said group is responsive to one of said plurality of memory addresses and the operation type if said protocol type comprises a single-instruction multiple-data (SIMD) protocol type;
   selecting a plurality of memory bank groups each consisting of one or more of said plurality of memory banks, where each of said plurality of groups is correspondingly uniquely responsive to one of said plurality of memory addresses and the operation type if said protocol type comprises a multiple-instruction multiple-data (MIMD) protocol type; and
   receiving or alternately returning an indication of data corresponding to said memory bank group selection and corresponding operation type indication.

2. The method of claim 1, further including:
   responsive to receiving the indication of the protocol type, selecting a first memory access group size for a first data processing unit different than a second memory access group size selected for a second data processing unit.

3. The method of claim 1, wherein the indication of the protocol type is selected from one of a hardware indication and a software indication.

4. The method of claim 2, wherein the first memory access group size is associated with a selected number of access bits.

5. The method of claim 2, further including:
   configuring a crossbar to operate using the first memory access group size responsive to receiving the indication of the protocol type.

6. An article including a machine-accessible storage medium comprising a computer executable program which when executed results in a machine performing:
   receiving an indication of a plurality of memory addresses, a protocol type, and an operation type;
   selecting a memory bank group consisting of one or more of a plurality of memory banks, wherein said group is responsive to one of said plurality of memory addresses and the operation type if said protocol type comprises a single-instruction multiple-data (SIMD) protocol type;
   selecting a plurality of memory bank groups each consisting of one or more of said plurality of memory banks, wherein each of said plurality of groups is correspondingly uniquely responsive to one of said plurality of memory addresses and the operation type if said protocol type comprises a multiple-instruction multiple-data (MIMD) protocol type; and
   receiving or alternately returning an indication of data corresponding to said memory bank group selection and corresponding operation type indication.

7. The article of claim 6, wherein the protocol type is selected from at least one of a SIMD protocol type, a MIMD protocol type, and a combination of the SIMD protocol type and the MIMD protocol type.

8. The article of claim 6, wherein the information, when accessed, results in a machine performing:
   responsive to receiving the indication of the protocol type, selecting a first memory access group size for a first data processing unit different than a second memory access group size; and
   selecting the second memory access group size for a second data processing unit.

9. An apparatus, including:
   an address interface to couple to at least one data processing unit, the address interface to receive an indication of a plurality of memory addresses, a protocol type, and an operation type; to select a memory bank group consisting of one or more of a plurality of memory banks, wherein said group is responsive to one of said plurality of memory addresses and the operation type if said protocol type comprises a single-instruction multiple-data (SIMD) protocol type; to select a plurality of memory bank groups each consisting of one or more of said plurality of memory banks, wherein each of said plurality of groups is correspondingly uniquely responsive to one of said plurality of memory addresses and the operation type if said protocol type comprises a multiple-instruction multiple-data (MIMD) protocol type; and to receive or alternately return an indication of data corresponding to said memory bank group selection and corresponding operation type indication.

10. The apparatus of claim 9, further including:
    a plurality of data processing units including the at least one data processing unit.

11. The apparatus of claim 10, wherein the plurality of data processing units are included in a single processing element.

12. The apparatus of claim 10, further including:
    a hardware address generator to generate the plurality of memory addresses.

13. A system, including:
    an address interface to couple to at least one data processing unit, the address interface to receive an indication of a plurality of memory addresses, a protocol type, and an operation type; to select a memory bank group consisting of one or more of a plurality of memory banks, wherein said group is responsive to one of said plurality of memory addresses and the operation type if said protocol type comprises a single-instruction multiple-data (SIMD) protocol type; to select a plurality of memory bank groups each consisting of one or more of said plurality of memory banks, wherein each of said plurality of groups is correspondingly uniquely responsive to one of said plurality of memory addresses and the operation type if said protocol type comprises a multiple-instruction multiple-data (MIMD) protocol type; and to receive or alternately return an indication of data corresponding to said memory bank group selection and corresponding operation type indication;
    a data processing unit capable of addressing the memory bank group selection; and an omnidirectional antenna to transmit data processed by the data processing unit.

14. The system of claim 13, further including:

a bus to couple the data processing unit to the memory bank group selection.

15. The system of claim 13, further including:

a memory to couple to the data processing unit and to store a plurality of memory access group sizes indexed to a corresponding plurality of protocol types.

16. The system of claim 13, further including:

a transceiver to couple a processing element including the data processing unit to the omnidirectional antenna.

17. An apparatus, including:

a plurality of memory banks addressable using an address interface to couple to at least one data processing unit, the address interface to receive an indication of a plurality of memory addresses, a protocol type, and an operation type; to select a memory bank group consisting of one or more of the plurality of memory banks, wherein said group is responsive to one of said plurality of memory addresses and the operation type if said protocol type comprises a single-instruction multiple-data (SIMD) protocol type; to select a plurality of memory bank groups each consisting of one or more of said plurality of memory banks, wherein each of said plurality of groups is correspondingly uniquely responsive to one of said plurality of memory addresses and the operation type if said protocol type comprises a multiple-instruction multiple-data (MIMD) protocol type; and to receive or alternately return an indication of data corresponding to said memory bank group selection and corresponding operation type indication.

18. The apparatus of claim 17, wherein the plurality of memory banks has a memory access group size, and wherein the memory access group size is reprogrammable and is selectable in software.

19. The apparatus of claim 17, further including:

a hardware element to store a plurality of output indications based on a corresponding plurality of memory access group sizes and responsive to a corresponding plurality of protocol type indications including the indication of the protocol type.

20. A method, including:

controlling a bandwidth of a memory coupled to a plurality of data processing units responsive to an address interface receiving an indication of a plurality of memory addresses, a protocol type, and an operation type; selecting a memory bank group consisting of one or more of a plurality of memory banks, wherein said group is responsive to one of said plurality of memory addresses and the operation type if said protocol type comprises a single-instruction multiple-data (SIMD) protocol type; and selecting a plurality of memory bank groups each consisting of one or more of said plurality of memory banks, wherein each of said plurality of groups is correspondingly uniquely responsive to one of said plurality of memory addresses and the operation type if said protocol type comprises a multiple-instruction multiple-data (MIMD) protocol type; and receiving or alternately returning an indication of data corresponding to said memory bank group selection and corresponding operation type indication.

21. The method of claim 20, wherein a number of data processing units in use selected from the plurality of data processing units is responsive to the indication of the protocol type provided by an application to be executed.

22. The method of claim 20, wherein the bandwidth of the memory is associated with a selected number of access bits provided by the plurality of data processing units.

23. The method of claim 20, wherein controlling the bandwidth further includes:

controlling an address mapping function of the memory.

* * * * *